UNITED STATES PATENT OFFICE.

BENJAMIN F. TABER, OF BUFFALO, NEW YORK.

IMPROVED PROCESS FOR PREPARING AND TANNING HIDES.

Specification forming part of Letters Patent No. 52,464, dated February 6, 1866.

*To all whom it may concern:*

Be it known that I, BENJ. F. TABER, of the city of Buffalo, county of Erie, and State of New York, have invented a new and Improved Process for Preparing and Tanning Hides; and I do hereby declare that the following is a full, clear, and exact description thereof.

I soak the hides in aqua calces, or a solution of lime in water, for the purpose of rendering them in a suitable condition for the process of working, and to keep them from decomposition during the process of preparing them for the tan. After they are sufficiently soaked and become plump, and the pores distended in the aqua calces, I put them into a strong lime, if the nature or condition of the stock requires it, for a length of time according to the condition or nature of the stock. I then take them out of the lime and put them into heated water, for the purpose of sweating and softening them, and loosening the hair. If the kind, nature, or condition of the stock does not require strong liming, I put them direct into the heated water from the aqua calces. After they have been kept in the heated water a suitable length of time to obtain the desired effect, I take them out and put them into a revolving drum or cylinder, made for the purpose of working hides in, with pegs and hooks inside, and holes in the circumference for the purpose of removing the hair. At the same time I let in heated water onto the hides, which keeps the pores open and facilitates the process of unhairing and cleansing. After they have been kept in the drum a suitable length of time, I take them out and fine-hair them in the ordinary way, after which I put them into the drum or cylinder and let in heated water, and keep them in motion until properly cleansed. If the hides have had strong lime I stop up the holes in the drum, and put in a small quantity of fowl-dung, or some other article used as a bate, and warm water, and run them for a short time, after which I unstop the holes and allow the water to pass in and out until the hides are properly cleansed.

If the hides are for sole-leather, or if it is desirable to have them plumped and quick-tanned, I put them into the aqua calces until plump and the pores are well distended, after which I put them into oak tan-liquor, or some other coloring matter, according to the color which may be desired, for the purpose of giving them a suitable color, after which I tan them by handling and laying away the ordinary way, or by hanging them in on sticks.

What I claim as my invention, and desire to secure by Letters Patent, is—

1. In the process of preparing hides, the use of aqua calces, or a solution of lime in water, as a soak for hides preparatory to liming or sweating, or both.

2. The use of heated water for sweating hides, either in connection with or without liming, or in connection with the use of aqua calces.

3. The use of heated water administered to hides while in motion in a drum or cylinder, for the purpose of removing the hair, cleansing them from lime, &c.

4. Bating, or abating, the lime from hides by the use of warm water and fowl-dung, or other articles used as a bate, administered to them while in motion in a drum or cylinder.

5. The use of aqua-calces, or a solution of lime in water, as a soak for hides after they have been otherwise prepared for the tan.

B. F. TABER.

Witnesses:
 W. H. FORBUSH,
 GEO. W. WALLACE.